3,819,801
PREFERENTIAL SULFIDING OF NICKEL AND COBALT OXIDES

James Alexander E. Bell, Toronto, Ontario, and Vaclav Opratko and Daniel Kelly, Clarkson, Ontario, Canada, assignors to The International Nickel Company, Inc., New York, N.Y.
No Drawing. Filed Feb. 12, 1973, Ser. No. 331,767
Claims priority, application Canada, Apr. 17, 1972, 139,858
Int. Cl. C01g 1/10, 1/12, 53/00
U.S. Cl. 423—138
15 Claims

ABSTRACT OF THE DISCLOSURE

Nickel values contained in oxide materials are selectively sulfided by heating an aqueous slurry containing the oxide material, dissolved chlorides and sulfur in a form capable of sulfiding nickel values to a temperature between about 200° C. and 240° C. under a hydrogen overpressure. Sea water can be employed in forming the aqueous slurry and, thus, act as a source of the dissolved chlorides.

---

The present invention relates to hydrometallurgy, and more particularly to a hydrometallurgical treatment of nickeliferous oxide materials to selectively sulfide nickel values.

Nickel-containing laterites potentially form the largest reserve of nickel ores, but nickel-containing laterites have remained largely untapped as a source of nickel due to the fact that most processes for recovering nickel from laterites are uneconomical. As the term "laterite" suggests, nickel containing lateritic ores are the products of weathering. More specifically, the mineral serpentine is dissolved by acidulated ground waters that are formed as a result of decaying organic matter. Dissolved values in the ground waters are precipitated upon neutralization by passage through more basic constituents. The process of dissolution and precipitation and, in some instances, redissolution and reprecipitation, has the effect of enriching the nickel content to a point where the precipitate becomes an ore, i.e., the nickel content of the precipitate is increased to the point where nickel recovery becomes economical. Complete weathering of serpentine produces a nickel-containing laterite known as limonite which contains concentrated amounts of iron, e.g. about 35% or higher, with the oxides of nickel and iron forming solid solutions. Incompletely weathered nickel-containing laterites contain large quantities of nickel in the form of silicates, which silicates are characterized by high magnesia contents. Nickel recovery from lateritic ores, whether limonitic or silicate, is complicated by the fact that nickel values cannot be concentrated by known beneficiation means, such as flotation. Thus, large quantities of ore must be treated to recover relatively small quantities of nickel.

It has been suggested that nickel-containing lateritic ores be treated with sulfuric acid at temperatures of about 500° F. under autogenously generated steam pressures. This process works reasonably well for limonitic ores due to the limited solubility of ferric iron at elevated temperatures. However, when treating ores with substantial amounts of magnesia, e.g. silicate ores, large quantities of sulfuric acid are consumed by the magnesia. The cost of sulfuric acid, along with the cost of shipping sulfuric acid to the remote tropic and subtropic regions where these ores occur, renders this process uneconomical for ores containing more than minor amounts of magnesia. Thus, this process is primarily designed for the treatment of limonitic ores.

In order to avoid the undesirable effects of magnesia or in other instances to overcome the adverse effects of large amounts of iron, it has been suggested that nickeliferous lateritic ores be selectively reduced to reduce substantially all of the nickel values to metallic nickel while reducing only controlled amounts of iron to metallic iron. Nickel is then recovered from the selectively reduced ore by subsequent pyrometallurgical, hydrometallurgical or vapometallurgical processes. Although all these processes work reasonably well and provide means for recovering nickel from lateritic ore, all of the processes share the common disadvantage of requiring a preliminary selective reduction operation. The selective reduction operation is not in and by itself objectionable, but is objectionable in that it requires a preliminary drying which can consume large quantities of fuel. Nickel-containing lateritic deposits contain 30%, and even 40%, water, by weight, and the cost involved in heating the ore to elevated temperatures to evaporate moisture and chemically combined water can render the overall process commercially unattractive.

Recognizing the problems associated with drying, two processes have recently been developed to avoid the drying operation. Both of these processes are hydrometallurgical in nature and involve selective sulfidation of the nickel values in lateritic ores. In Canadian Pat. No. 765,348, which was issued on Aug. 15, 1967, an aqueous slurry of nickeliferous lateritic ore is heated with a sulfur-bearing material under hydrogen partial pressures of at least about 200 p.s.i.g. to a temperature above about 500° F. to render nickel and cobalt values in the ore soluble. This process involves the use of high temperatures and pressures with the total pressure at times reaching 2000 p.s.i.g. In U.S. Pat. No. 3,365,341, nickel values in lateritic ores are sulfided by heating an aqueous slurry of the ore and elemental sulfur in amounts ranging between 7½% and 40% per ton of ore to a temperature somewhat lower than the temperature employed in the process described in Canadian Pat. No. 765,348. The process described in U.S. Pat. No. 3,365,341 requires the use of uneconomically large amounts of elemental sulfur. The necessity of using abnormally high temperatures and pressures or large quantities of elemental sulfur makes these processes uneconomical since expensive equipment capable of withstanding high temperatures and pressures or large amounts of reagents materially add to the overall cost. Although attempts were made to overcome the foregoing difficulties and other disadvantages none, as far as we are aware, was entirely successful when carried into practice commercially on an industrial scale.

It has now been discovered that nickel and cobalt values contained in lateritic ores can be selectively sulfided for subsequent recovery without prior drying, without the use of uneconomically large amounts of reagents and without the use of unduly high temperatures and pressures by using a special aqueous solution in forming the slurry for selective sulfidation and by special control of the atmosphere and temperature above the slurry.

It is an object of the present invention to provide a process for selectively sulfiding nickel values contained in nickeliferous oxide materials.

Another object of the invention is to provide a process for selectively sulfiding nickel values contained in lateritic ores.

The invention also contemplates providing a process for selectively sulfiding nickel and cobalt values contained in lateritic ores.

It is a further object of the invention to provide a process for selectively sulfiding substantially all the nickel values contained in limonitic type lateritic ores while sulfiding only controlled amounts of iron.

The invention further contemplates providing a hydrometallurgical process for selectively sulfiding nickel values contained in nickeliferous oxide materials while employing only moderately high temperatures and pressures.

Another object of the invention is to provide a hydrometallurgical process for selectively sulfiding nickel and cobalt values contained in lateritic ores using economical amounts of sulfur-bearing materials.

Other objects and advantages will become apparent from the following description.

Generally speaking, the present invention contemplates a process for selectively sulfiding nickel values and any cobalt values contained in nickeliferous oxide materials. An aqueous slurry of finely divided nickeliferous oxide material, without any prior treatment except grinding, if required, is established. The slurry contains at least about 10 grams per liter (g.p.l.) chloride ions and a sulfur-bearing material in an amount sufficient to provide between about 2% and 4% sulfur per ton of ore, which sulfur-bearing material is capable of sulfiding nickel and cobalt. The slurry is heated in a suitable vessel to a temperature between about 200° C. and 240° C. under superatmospheric pressures including a partial pressure of hydrogen of at least about 8 and, advantageously, at least about 14 atmospheres to selectively sulfide nickel and cobalt values contained in the nickeliferous oxide material.

Any nickeliferous oxide material can be processed in accordance with the present invention. For example, nickel-containing pyrrhotite can be roasted to recover the sulfur therefrom and the remaining oxide can be treated to selectively sulfide the nickel values. The process, however, will most frequently be employed in the recovery of nickel from nickeliferous lateritic ores. Thus, lateritic ores containing at least about 1.0% nickel, up to about 0.20% cobalt, between about 40% and 50% iron, up to about 3 or even 5% magnesia, up to about 10% or more of silica, small amounts of alumina and calcium oxide and the balance essentially water can be treated in accordance with the process of the present invention. For purposes of economical processing, the ore advantageously contains between about 1.0% and 2.0% nickel, up to about 0.20% cobalt and between about 40% and 50% iron. It will be noted that all percentages given herein are on a weight basis unless otherwise specified. Nickel and cobalt, as is well known in the art, display many similar characteristics and in order to simplify the following description only nickel will be referred to but it will be understood that cobalt will behave in a manner similar to nickel.

As noted hereinbefore, one of the distinct advantages of the present invention is that nickel values contained in nickeliferous oxide materials can be selectively sulfided without any preliminary treatment, such as drying. When treating nickeliferous lateritic ores, particularly of the limonitic type, not even crushing may be necessary. If the ore is sufficiently fine to provide a stable slurry, which facilitates gas-solid and liquid-solid contact, crushing is not required.

After crushing, if required, an aqueous slurry of the oxide material is established. The amount of solids contained in the slurry is optimized to most efficiently utilize pressure equipment employed in sulfiding while minimizing problems associated with materials handling. The amount of solids in the slurry should not be so small as to render the operation of the autoclave inefficient and to require additional pumping facilities. On the other hand, the amount of solids in the slurry should not be so great that pumps cannot effectively handle the slurry, or that a stable suspension cannot be maintained in the autoclave. For physical and chemical reasons, slurries containing between about 20% and 45% solids and advantageously between about 20% and 40% solids, are employed.

An important feature of the present invention is the provision of chloride ions in the aqueous slurry. The presence of at least about 10 g.p.l. of chloride ions in the aqueous solution forming the slurry (i.e. to aqueous liquid phase of the slurry) makes it possible to selectively sulfide the nickel values at substantially lower temperatures, thereby avoiding the high steam pressures autogenously generated at higher temperatures, and lessen the amount of sulfur-bearing materials required for sulfiding. The chloride ions can be introduced to the aqueous slurry by adding thereto at least one water soluble chloride selected from the group consisting of iron, chloride, and the water soluble chlorides of the metals, of groups I and II of the periodic table, e.g. magnesium chloride, sodium chloride, calcium chloride, and potassium chloride. Advantageously, the slurry is formed with sea water, which contains magnesium chloride and which can be treated by partial evaporation prior to use if it is necessary to increase the concentration of the chloride ions. As will be shown hereinafter, a minimum concentration of chloride ions in the aqueous slurry is required in order to insure that at least about 80% of the nickel values contained in the nickeliferous oxide ore are sulfided. The aqueous slurry contains at least about 10 g.p.l. chloride ions, advantageously between about 10 g.p.l. and 20 g.p.l. chloride ions, in order to insure that economic proportions of nickel values are selectively sulfided while employing reasonable amount of sulfur-bearing material and only moderate sulfiding conditions. Higher chloride concentrations can be employed, but such higher concentrations drastically increase corrosion problems, particularly at elevated temperatures and pressures.

Sulfur required for sulfiding nickel values contained in nickeliferous oxide materials is added to the aqueous slurry in amounts between about 2% and 4%, based on the weight of the ore. Lesser amounts of sulfur provide insufficient sulfiding action and render the process inefficient while greater amounts add to the cost of the process without contributing any ascertainable advantage. The sulfur can be added to the slurry in the form of elemental sulfur, as a water soluble sulfide (including hydrogen sulfide) and as a metal sulfide which is acid soluble and which is more soluble in acid solutions than is nickel sulfide. Advantageously, the sulfur-bearing material is at least one member selected from the group consisting of elemental sulfur, hydrogen sulfide, sodium sulfide, ammonium sulfide, ferrous sulfide and sodium hydrosulfide. In determining the amount of sulfur added to the aqueous slurry, it is the amount of sulfur per ton of ore added to the aqueous slurry that is important and not the amount of the compound itself.

After establishing the aqueous slurry containing nickeliferous oxide materials, chloride ions and a sulfur-bearing material, the slurry is heated to a temperature between about 200° C. and 240° C. At temperatures below about 200° C. little, if any, sulfiding action is observed. Although temperatures above about 240° C. can be employed, the use of such high temperatures requires much heavier equipment to handle the high steam pressures autogenously generated without substantially improving the overall efficiency of the process. The slurry is maintained at temperature sufficiently long to insure that a preponderant part or substantially all the nickel values are selectively sulfided. Usually, about 2 hours to 4 hours at temperature will be sufficient.

In accordance with the process of the present invention, selective sulfiding takes place under reducing condition. Reducing conditions are advantageously established by heating the aqueous slurry under an overpressure of hydrogen. Advantageously, having regard to the rate of reaction and efficient pressure vessel utilization, hydrogen partial pressures between about 10 atmospheres and 20 atmospheres are employed. Lower hydrogen partial pressures can be employed but longer reaction periods are required. Higher hydrogen partial pressures can be employed but no observable benefits are obtained and provisions for heavier pressure equipment must be made.

Selectively sulfided nickel and cobalt values can be recovered by conventional processes. For example, the selectively sulfided slurry can, without any further treatment, be aerated with a free-oxygen-containing gas to oxidize the sulfides of nickel and cobalt to their respective water-soluble sulfates. Such oxidative leaching can be conducted at temperatures as low as about 70° C. However, oxidative leaching is conducted at temperatures above about 100° C. with superatmospheric pressures of free oxygen for the purpose of increasing the rate of oxidation. Alternatively, sulfided nickel and cobalt values can be recovered by adding ammonia to the slurry and thereafter aerating the slurry. As is the case with direct oxidative leaching, elevated temperatures and elevated partial pressures of free oxygen are employed in order to increase the rate of leaching. Ammonia leaching has the advantage of minimizing dissolution of any sulfided iron values since only insignificant amounts of iron are soluble in ammoniacal solutions, but ammonia leaching does have the disadvantage of requiring additional reagents. The pregnant leach solutions, whether obtained by oxidative leaching or by ammonia leaching, are relatively dilute, and nickel recovery and purifications are facilitated by precipitation of nickel values from the pregnant solutions. The leached solids are separated from the pregnant solution by filtration of the like and are discarded. Thereafter, the pregnant solution can be treated by the addition of a base to precipitate nickel hydroxide or by the addition of a water-soluble sulfide to precipitate nickel sulfide, either of which can be subsequently treated for nickel recovery. The precipitated nickel values whether in the form of sulfides or hydroxides can be treated by pyrometallurgical and/or vapometallurgical techniques to recover a purified and marketable nickel product.

For the purpose of giving those skilled in the art a better understanding of the invention, the following illustrative examples are given:

Example I

A nickeliferous lateritic ore containing 1.43% nickel, 0.20% cobalt, 45.2% iron and 39.6% water was ground and mixed with elemental sulfur in an amount of 3%. The ore-sulfur mixture was slurried with water to provide a slurry of about 20% solids, and sufficient magnesium chloride was added to provide a chloride concentration of about 11 g.p.l. The slurry was transferred to a titanium autoclave and was heated to 240° C. while an impeller was rotated at 600 revolutions per minute to stabilize the slurry. A hydrogen partial pressure of about 13.5 atmospheres was maintained above the slurry which resulted in a total pressure of about 47.5 atmospheres gauge. After 4 hours at reaction temperature, 87% of the nickel and 76% of the cobalt in the ore were selectively converted to sulfides, and the aqueous solution resulting therefrom contained less than about 0.001 g.p.l. of each of these elements. Upon leaching the selectively sulfided ore with an aerated ammonia solution, 82% of the nickel contained in the ore was recovered.

Example II

This example confirms that nickel recoveries can be improved by increasing the chloride ion concentration in the aqueous slurry. A lower grade ore, containing only 1.2% nickel, was treated as described in Example I, except that different amounts of magnesium chloride, were added to the aqueous slurry. In test A, 3.5% magnesium chloride, based on the weight of the ore was added to the aqueous slurry, while in tests B and C magnesium chloride additions of 4.65% and 5.85%, respectively, were employed. After selective sulfidation, the sulfided nickel values were leached from the ore to recover nickel. The results of tests A, B and C are reported in Table 1. It is readily apparent from the results in Table 1 that greater chloride ion concentrations dramatically improve the effectiveness of selective sulfidation.

TABLE 1

| Test | Cl concentration, g.p.l. | Ni recovery, percent |
|---|---|---|
| A | 6.5 | 73 |
| B | 6.7 | 78 |
| C | 10.9 | 84 |

Example III

A sample of ore having the same composition as that disclosed in Example I was mixed with 3% elemental sulfur and was slurried with synthetic sea water containing 1.27 g.p.l. magnesium, 10.7 g.p.l. sodium and about 20 g.p.l. total chlorides The slurry, which contained about 20% solids, was treated under the same conditions, including atmosphere, temperature and time, as described in Example I It was determined that 88% of the nickel and 82% of the cobalt in the ore were converted to leachable sulfides and that the seawater, after the selective sulfidation, contained less than about 0.001 g.p.l. of each of these elements.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention.

We claim:

1. A process for selectively sulfiding nickel values contained in nickeliferous oxide materials which comprises: establishing an aqueous slurry of finely divided nickeliferous oxide materials, the aqueous slurry having dissolved therein at least about 10 g.p.l. chloride ions; providing the aqueous slurry with sulfur in a form capable of sulfiding nickel and in an amount between about 2% and 4%, based on the weight of the nickeliferous oxide material; and heating the slurry under superatmospheric pressures, including a partial pressure of hydrogen of at least about 8 atmospheres, to a temperature between about 200° C. and 240° C. to selectively sulfide nickel values contained in the nickeliferous oxide material.

2. The process as described in claim 1 wherein the nickeliferous oxide material is a nickeliferous lateritic ore.

3. The process as described in claim 2, wherein the nickeliferous lateritic ore is limonite.

4. The process as descrbed in claim 1, wherein the sulfur is added as at least one member selected from the group consisting of elemental sulfur, hydrogen sulfide, sodium sulfide, ammonium sulfide, ferrous sulfide and sodium hydrosulfide.

5. The process as described in claim 4, wherein the aqueous liquid phase of the aqueous slurry has dissolved therein between about 10 g.p.l. and 20 g.p.l. chloride ions.

6. The process as described in claim 5, wherein the chloride ion is added to the aqueous slurry as at least one member selected from the group consisting of iron chloride and the water-soluble chlorides of the metals of group I and II of the periodic table.

7. The process as described in claim 4, wherein sea water is employed in forming the aqueous slurry.

8. The process as described in claim 1, wherein the partial pressure of hydrogen is between about 10 atmospheres and 20 atmospheres.

9. The process as described in claim 1, wherein the selectively sulfided nickel values are recovered by oxidative leaching.

10. The process as described in claim 1, wherein the selectively sulfided nickel values are recovered by leaching with an aerated ammoniacal solution.

11. A process for selectively sulfiding nickel values contained in nickeliferous lateritic ores which comprises establishing an aqueous slurry of finely divided nickeliferous lateritic ore, the aqueous slurry having dissolved therein at least about 10 g.p.l. chloride ions; providing the slurry with a sulfur-bearing material in the form capable of sulfiding nickel values contained in the nickeiferous lateritic ore and in an amount of at least about 3%, based on the weight of the nickeliferous lateritic ore; and heating the slurry under superatmospheric pressures, including a hydrogen partial pressure of at least about 8 atmospheres, to a temperature of at least about 220° C. to selectively sulfide nickel values contained in the nickeliferous oxide material.

12. The process as described in claim 11, wherein the nickeliferous lateritic ore is limonitic.

13. The process as described in claim 11 wherein the sulfur-bearing material is provided in an amount between about 2% and 4%, based on the weight of the nickeliferous lateritic ore.

14. The process as described in claim 11, wherein the aqueous slurry is heated to a temperature between about 200° C. and 240° C.

15. The process as described in claim 11, wherein the hydrogen partial pressure is between about 10 atmospheres and 20 atmospheres, and the total pressure is below about 50 atmospheres.

References Cited

UNITED STATES PATENTS

| | | | |
|---|---|---|---|
| 3,365,341 | 1/1968 | Fitzhugh et al. | 423—141 X |
| 3,041,138 | 6/1962 | Corbiau | 423—141 |
| 603,797 | 5/1898 | Storer | 423—141 |
| 2,693,404 | 11/1954 | Mackiw | 423—141 X |

OSCAR R. VERTIZ, Primary Examiner

B. E. HEARN, Assistant Examiner

U.S. Cl. X.R.

423—561; 75—119